United States Patent
Powell

(10) Patent No.: US 10,205,936 B2
(45) Date of Patent: Feb. 12, 2019

(54) FIXED BROADHEAD

(71) Applicant: Keith Powell, Rockwall, TX (US)

(72) Inventor: Keith Powell, Rockwall, TX (US)

( * ) Notice: Subject to any disclaimer, the term of this patent is extended or adjusted under 35 U.S.C. 154(b) by 0 days.

(21) Appl. No.: 15/842,587

(22) Filed: Dec. 14, 2017

(65) Prior Publication Data

US 2018/0109779 A1    Apr. 19, 2018

Related U.S. Application Data

(63) Continuation-in-part of application No. 15/601,744, filed on May 22, 2017, which is a continuation of application No. 15/097,129, filed on Apr. 12, 2016, which is a continuation of application No. 14/542,243, filed on Nov. 14, 2014, now Pat. No. 9,335,135, which is a continuation of application No. 13/943,379, filed on Jul. 16, 2013, now Pat. No. 8,915,808.

(Continued)

(51) Int. Cl.
| | |
|---|---|
| *F42B 6/08* | (2006.01) |
| *H04N 13/398* | (2018.01) |
| *F42B 12/34* | (2006.01) |
| *A63F 13/25* | (2014.01) |
| *A63F 13/40* | (2014.01) |
| *H04N 13/383* | (2018.01) |
| *H04N 13/302* | (2018.01) |
| *H04N 13/324* | (2018.01) |
| *H04N 13/144* | (2018.01) |
| *H04N 13/366* | (2018.01) |
| *A63F 13/00* | (2014.01) |
| *G02B 27/00* | (2006.01) |
| *G02B 27/22* | (2018.01) |
| *G06F 3/00* | (2006.01) |

(52) U.S. Cl.
CPC .......... *H04N 13/398* (2018.05); *A63F 13/00* (2013.01); *A63F 13/25* (2014.09); *A63F 13/40* (2014.09); *F42B 6/08* (2013.01); *F42B 12/34* (2013.01); *G02B 27/0093* (2013.01); *G02B 27/2214* (2013.01); *G06F 3/00* (2013.01); *G06F 3/005* (2013.01); *H04N 13/144* (2018.05); *H04N 13/302* (2018.05); *H04N 13/324* (2018.05); *H04N 13/366* (2018.05); *H04N 13/383* (2018.05)

(58) Field of Classification Search
CPC ......................................................... F42B 6/08
See application file for complete search history.

(56) References Cited

U.S. PATENT DOCUMENTS

| | | |
|---|---|---|
| 3,138,383 A | 6/1964 | McKinzie |
| 5,931,751 A * | 8/1999 | Cooper ............ F42B 6/08 473/583 |

(Continued)

*Primary Examiner* — John Ricci
(74) *Attorney, Agent, or Firm* — Kirby Drake

(57) ABSTRACT

Fixed broadheads may be provided having main blades connected to a tip and secured within a slot or chamber in the body of the broadhead. Secondary blades may interlock with the main blades inside of a ferrule, thereby forming a fixed broadhead with an advanced and strong retention system. The main blades may be pinned to the tip of the broadhead through blade pins and the secondary blades may interlock with the main blades, thereby improving the strength and precision of the fixed broadhead in its movement toward a target.

18 Claims, 16 Drawing Sheets

Related U.S. Application Data

(60) Provisional application No. 61/682,831, filed on Aug. 14, 2012.

(56) References Cited

U.S. PATENT DOCUMENTS

| | | |
|---|---|---|
| 6,669,589 B2 | 12/2003 | Barrie et al. |
| 6,910,979 B2 | 6/2005 | Barrie et al. |
| 7,871,345 B2 * | 1/2011 | Cooper .................... F42B 6/08 473/584 |
| 7,905,802 B2 | 3/2011 | Erhard |
| 8,016,704 B1 | 9/2011 | Vandewater |
| 8,100,788 B2 * | 1/2012 | Sanford .................... F42B 6/08 473/582 |
| 8,105,187 B1 | 1/2012 | Sanford |
| 8,197,367 B2 | 6/2012 | Pulkabek |
| 8,393,983 B1 | 3/2013 | Sanford |
| 8,545,349 B1 | 10/2013 | Budris et al. |
| 8,911,311 B1 | 12/2014 | Mizek et al. |
| 8,915,808 B2 | 12/2014 | Powell |
| 2009/0203477 A1 | 8/2009 | Mizek et al. |
| 2012/0165142 A1 | 6/2012 | Grace |

* cited by examiner

FIXED BROADHEAD

CROSS-REFERENCE TO RELATED APPLICATIONS

This application is a continuation-in-part of U.S. patent application Ser. No. 15/601,744 filed May 22, 2017, which is a continuation of U.S. patent application Ser. No. 15/097,029 filed on Apr. 12, 2016 entitled REAR-DEPLOYING MECHANICAL BROADHEAD, which is a continuation of U.S. patent application Ser. No. 14/542,243 filed on Nov. 14, 2014 entitled REAR-DEPLOYING MECHANICAL BROADHEAD (issued as U.S. Pat. No. 9,335,135), which is a continuation of U.S. patent application Ser. No. 13/943,379 filed on Jul. 16, 2013, entitled REAR-DEPLOYING MECHANICAL BROADHEAD (issued as U.S. Pat. No. 8,915,808), which claims the benefit of U.S. Provisional Patent Application No. 61/682,831 filed on Aug. 14, 2012, all of which are incorporated by reference in their entirety.

FIELD OF THE DISCLOSURE

The present disclosure generally relates to broadheads, and more particularly to fixed broadheads.

BACKGROUND

Broadheads are arrowheads that have a minimum of two sharp blades that may cause severe damage to their target and are designed for hunting purposes. Fixed broadheads are a type of broadhead that include immovable parts. Some fixed broadheads can lack strength and dependability when striking hard objects. Additionally, some fixed broadheads with smaller blades may be susceptible to the blades being damaged or knocked off when striking hard objects.

SUMMARY

Embodiments of the present disclosure may provide a fixed broadhead that may have a tip coupled to a body in which a slot may be disposed within the body. The fixed broadhead may have main blades pinned to the tip and secondary blades disposed within the slot and interlocked with the main blades. Interlocked main blades and the secondary blades may improve strength and precision of the fixed broadhead. The tip may be coupled to the body by at least two tip screws. The main blades may be pinned to the tip with at least two blade pins and may be disposed diametrically opposite each other along a longitudinal axis of the body. The secondary blades may be disposed diametrically opposite each other along a latitudinal axis of the body. A plurality of anchor points may provide stability and may lock the tip, main blades, and secondary blades with the body. The fixed broadhead may provide a first anchor point of the plurality of anchor points that may stabilize and lock the main blades with the tip. The fixed broadhead may provide a second anchor point of the plurality of anchor points that may stabilize and interlock the main blades with the secondary blades. Additionally, the fixed broadhead may provide a third anchor point of the plurality of anchor points that may stabilize and interlock the main blades with into a rear of a ferrule.

Embodiments of the present disclosure may provide a fixed broadhead that may provide main blades disposed diametrically opposite each other along a longitudinal axis of a body. The fixed broadhead may also provide secondary blades disposed diametrically opposite each other along a latitudinal axis of the body. The fixed broadhead may further provide a tip that may be coupled to the body. The tip may have a hollow area in which the main blades may rest, and the secondary blades may be disposed within a slot in the body and may interlock with the main blades. The fixed broadhead may provide an opening within the body that may receive at least two screws that may couple the body to the tip and at least two blade pins that may couple the main blades to the tip. The interlocked main blades and the secondary blades may improve strength and precision of the fixed broadhead. The fixed broadhead may provide a plurality of anchor points that may provide stability and lock the tip, main blades, and secondary blades with the body. The fixed broadhead may provide a first anchor point of the plurality of anchor points that may stabilize and lock the main blades with the tip. The fixed broadhead may provide a second anchor point of the plurality of anchor points that may stabilize and interlock the main blades with the secondary blades. Additionally, the fixed broadhead may provide a third anchor point of the plurality of anchor points that may stabilize and interlock the main blades with into a rear of a ferrule. The first, second, and third anchor points may provide a strong retention system and may improve its overall precision and reliability of the fixed broadhead. The tip may be made of two separate components.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
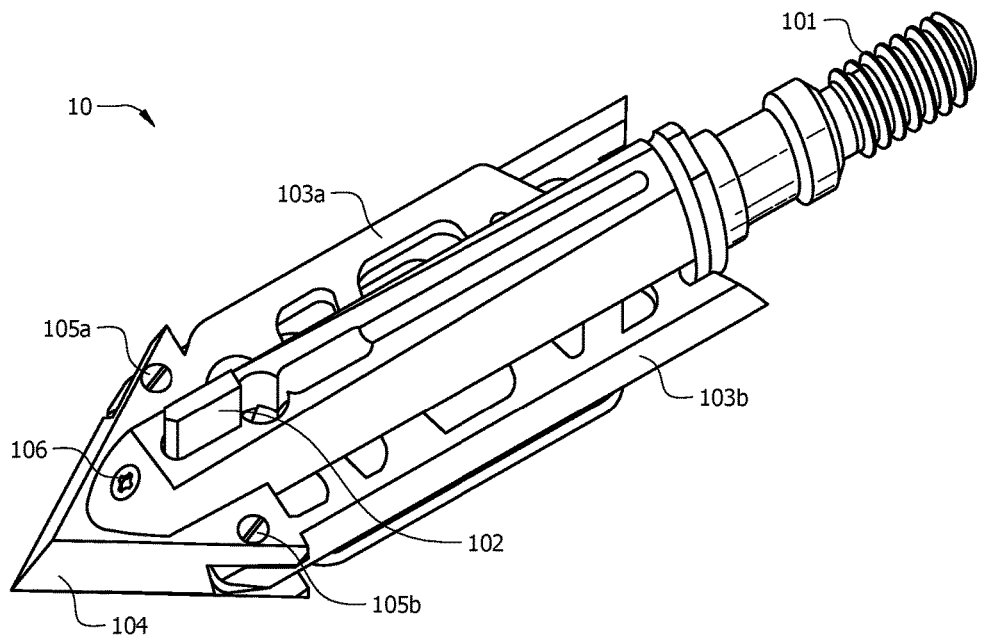
FIG. 1 depicts a view of a rear-deploying mechanical broadhead in a closed position according to an embodiment of the present disclosure.
Figure 2:
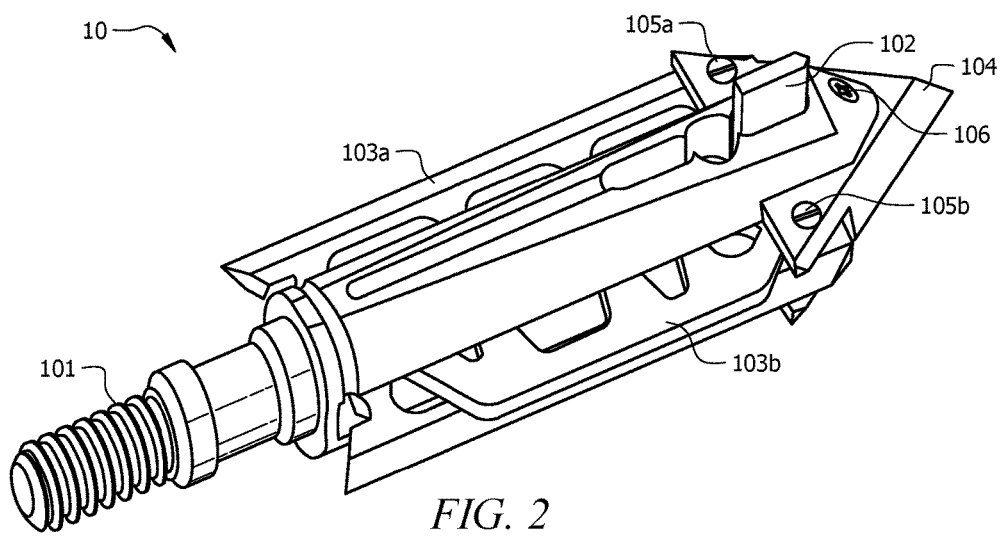
FIG. 2 depicts a view of a rear-deploying mechanical broadhead in a closed position according to an embodiment of the present disclosure.
Figure 3:
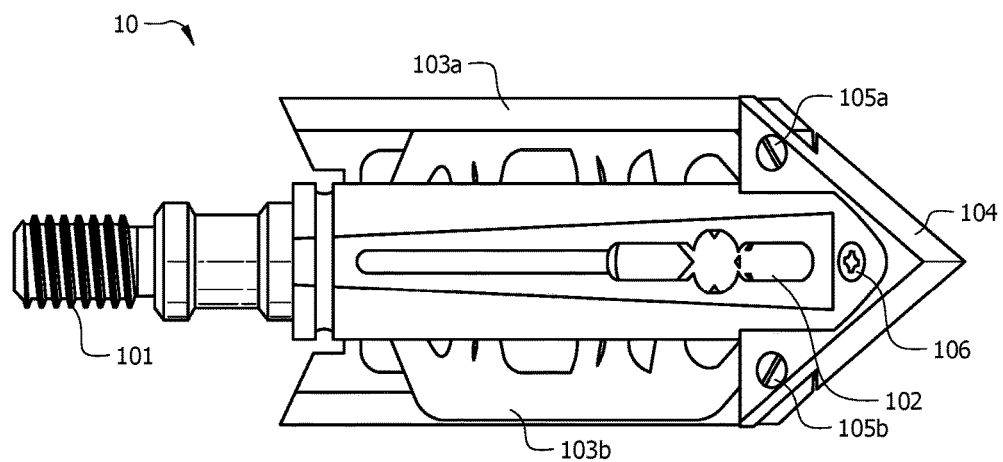
FIG. 3 depicts a view of a rear-deploying mechanical broadhead in a closed position according to an embodiment of the present disclosure.
Figure 4:
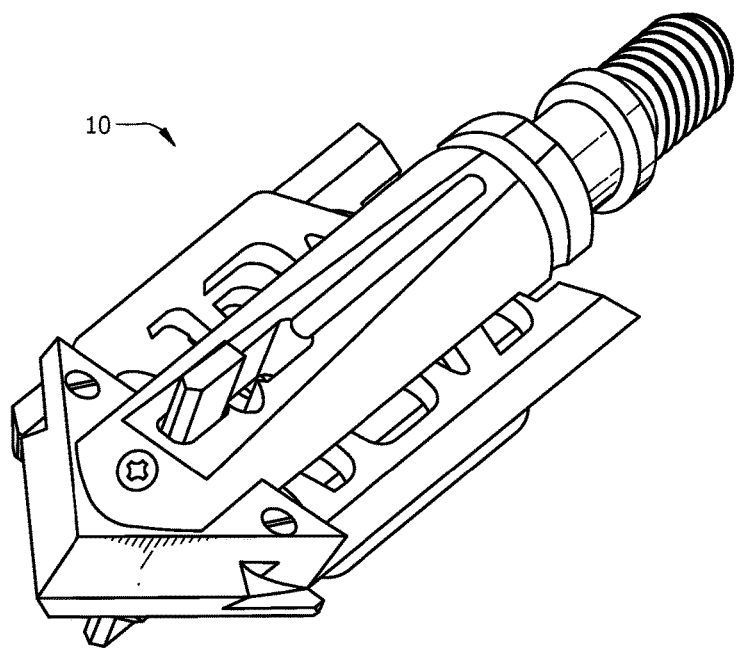
FIG. 4 depicts a view of a rear-deploying mechanical broadhead in a closed position according to an embodiment of the present disclosure.

Embodiments of the present disclosure may provide a rear-deploying mechanical broadhead including a drive pin/key set through the body of the broadhead. This drive pin/key may drive the blades open when it moves from a first position closest to the tip of the broadhead to a second position away from the tip of the broadhead according to embodiments of the present disclosure. When the drive pin/key moves back to the second position, the drive pin/key opens the broadhead blades ahead of the blades actually touching the target, and the blades may push outwardly from the rear of the body of the broadhead and butterfly or scissor. Because the drive pin/key holds the blades stationary until contact is made with the drive pin/key, the blades of the broadhead may remain stationary (i.e., are not loose and/or flopping around) during flight toward a target, thereby lessening the likelihood that the broadhead may be errant in its movement toward a target. The tip may be a solid cut on contact tip that does not move in all operations of the broadhead. Accordingly, the cutting achieved by the broadhead may be maximized (i.e., a wider cutting diameter) while also ensuring that the blades and tip of the broadhead may remain secure in flight toward its target. Further, a mechanical broadhead formed according to embodiments of the present disclosure may fly like a field point but strike like a fixed blade.

Embodiments of the present disclosure may provide a fixed broadhead including at least one main blade and at least one secondary blade. The at least one main blade may be attached to a tip of the fixed broadhead by sliding over pins or a post provided in the tip. The at least one secondary blade may be inserted into a ferrule through a blade slot, and the at least one main blade may be inserted into a backend of the ferrule. Accordingly, the fixed broadhead may provide a retention system that may provide a strong dual blade system.

FIGS. 1-4 depict various views of rear-deploying mechanical broadhead 10 in a closed position according to embodiments of the present disclosure. Broadhead 10 may include body 101 with a first end and a second end having an opening/slot at the second end for receiving tip/body pin 106 that may couple body 101 to tip 104. Tip 104 may include a pointed end that may facilitate penetration of tip 104 into a target.

Blades 103a, 103b may be disposed substantially diametrically opposite each other about the longitudinal axis of body 101. Blades 103a, 103b may be coupled to tip 104 and attached with blade pins 105a, 105b secured in slots on opposite sides of body 101. Blades 103a, 103b may receive blade pins 105a, 105b at the forward portions of blades 103a, 103b nearer to tip 104 and the second end of body 101. As blades 103a, 103b are connected to tip 104 through blade pins 105a, 105b respectively, blades 103a, 103b may remain stationary while in flight toward a target. Blades 103a, 103b may include cutting edges. The cutting width of blades 103a, 103b may be smaller near tip 104 and may gradually increase toward the rear along a leading edge of the blade. While two blades 103a, 103b have been depicted in FIGS. 1-4, it should be appreciated that more or fewer blades may be included as part of broadhead 10 without departing from the present disclosure.

Body 101 also may be sized to include a chamber or slot toward the second end of body 101 for receiving drive pin/key 102. The chamber or slot may include a first position close to tip 104 and a second position away from tip 104. In FIGS. 1-4, drive pin/key 102 is depicted in a first position. It should be appreciated that blades 103a, 103b may be fixed and only open out through movement of drive pin/key 102 from the first position to the second position. Blades 103, 103b may remain closed while drive pin/key 102 is in the first position close to tip 104 within the slot or chamber in body 101. As such, blades 103a, 103b do not rock and are not loose when broadhead 10 is flying through the air toward a target because the blades are held stationary until contact is made with the drive pin/key. The first end of body 101 may be threaded in some embodiments of the present disclosure; however, it should be appreciated that the first end of body 101 may assume other shapes without departing from the present disclosure. It also should be appreciated that body 101 may be formed from different materials, including but not limited to steel, titanium, composite, plastic, and lightweight aluminum alloy, according to embodiments of the present disclosure.

Figure 5:
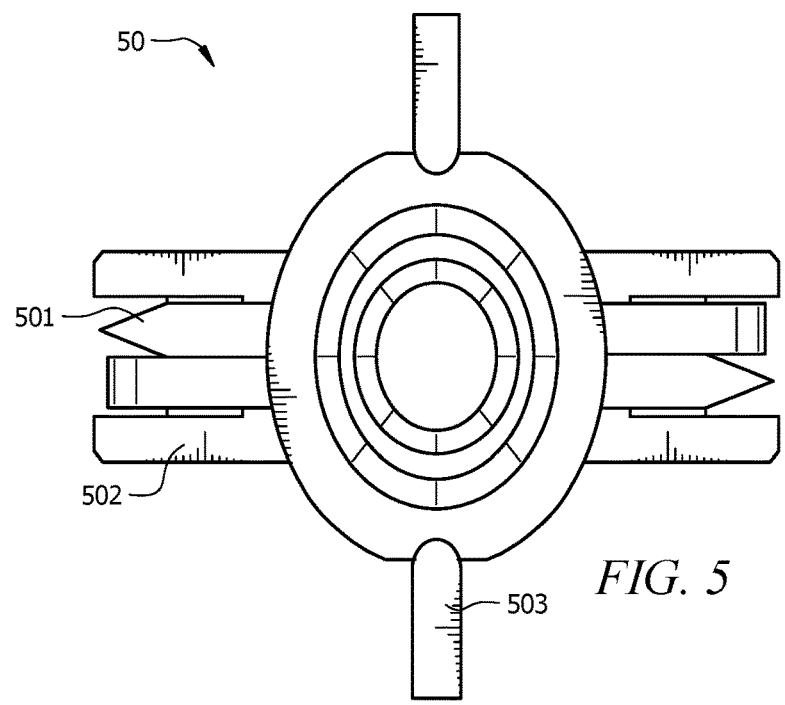
FIG. 5 depicts a perspective view of a rear-deploying mechanical broadhead in a closed position from a view behind the drive pin/key according to an embodiment of the present disclosure.
Figure 6:
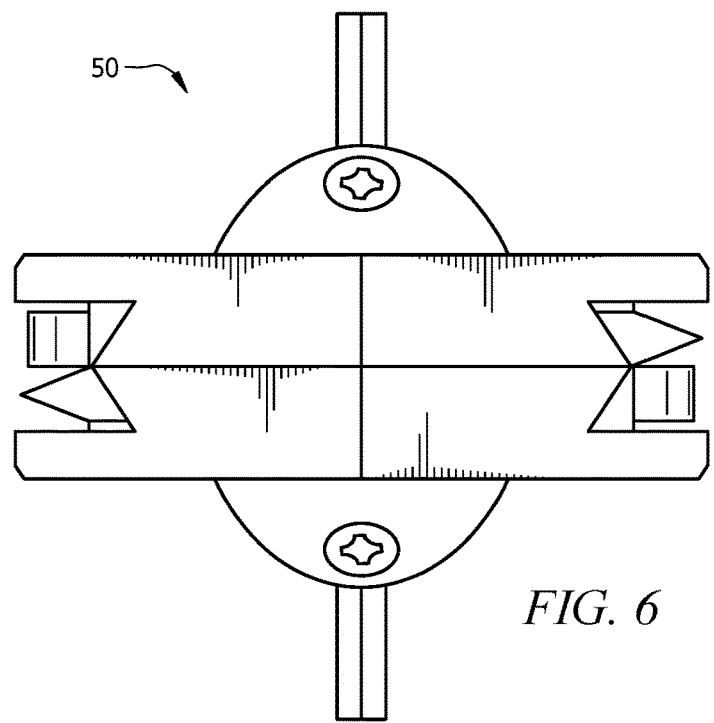
FIG. 6 depicts a perspective view of a rear-deploying mechanical broadhead in a closed position from a view in front of the drive pin/key according to an embodiment of the present disclosure.
Figure 7:
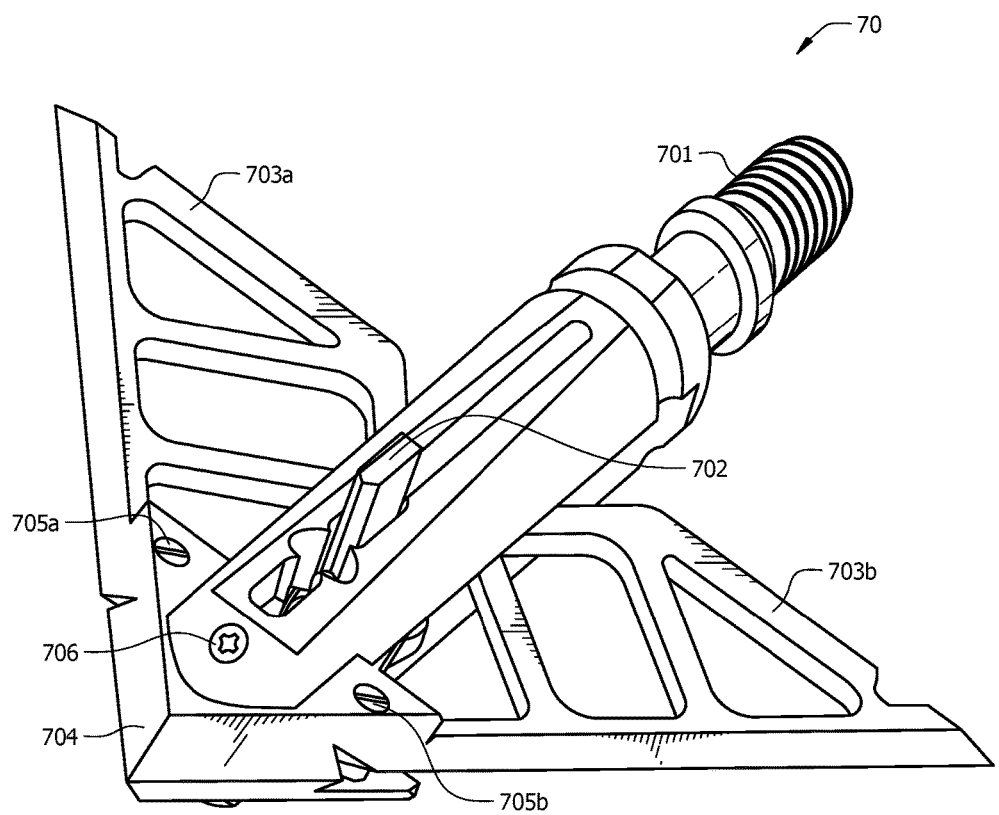
FIG. 7 depicts a view of a rear-deploying mechanical broadhead in an open position according to an embodiment of the present disclosure.
Figure 8:
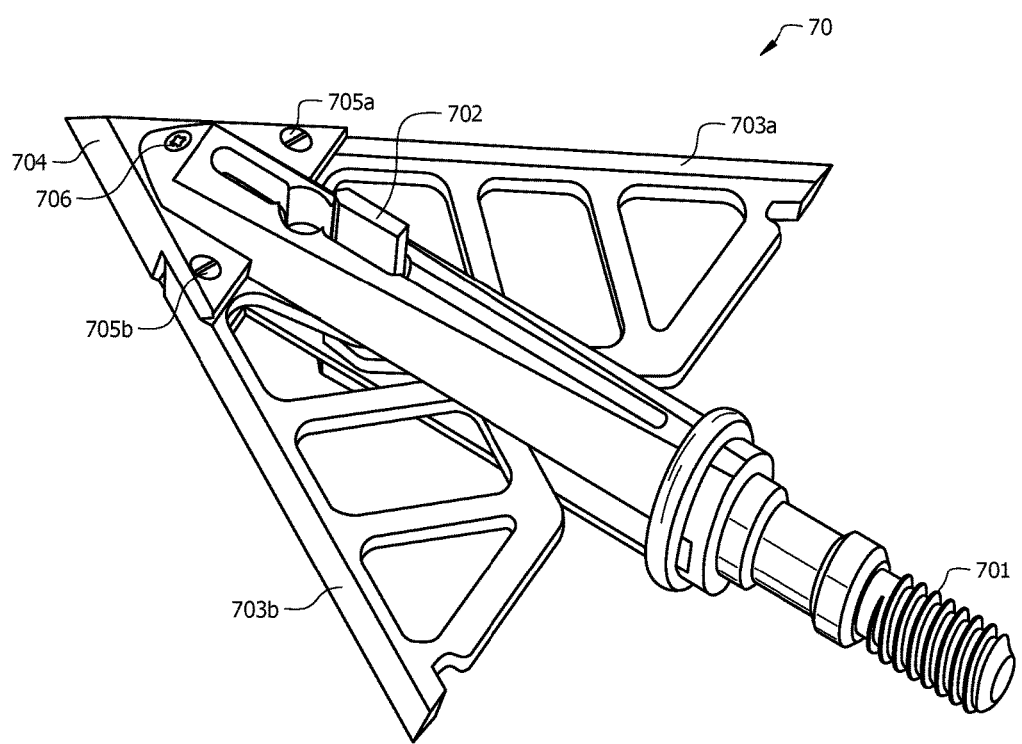
FIG. 8 depicts a view of a rear-deploying mechanical broadhead in an open position according to an embodiment of the present disclosure.
Figure 9:
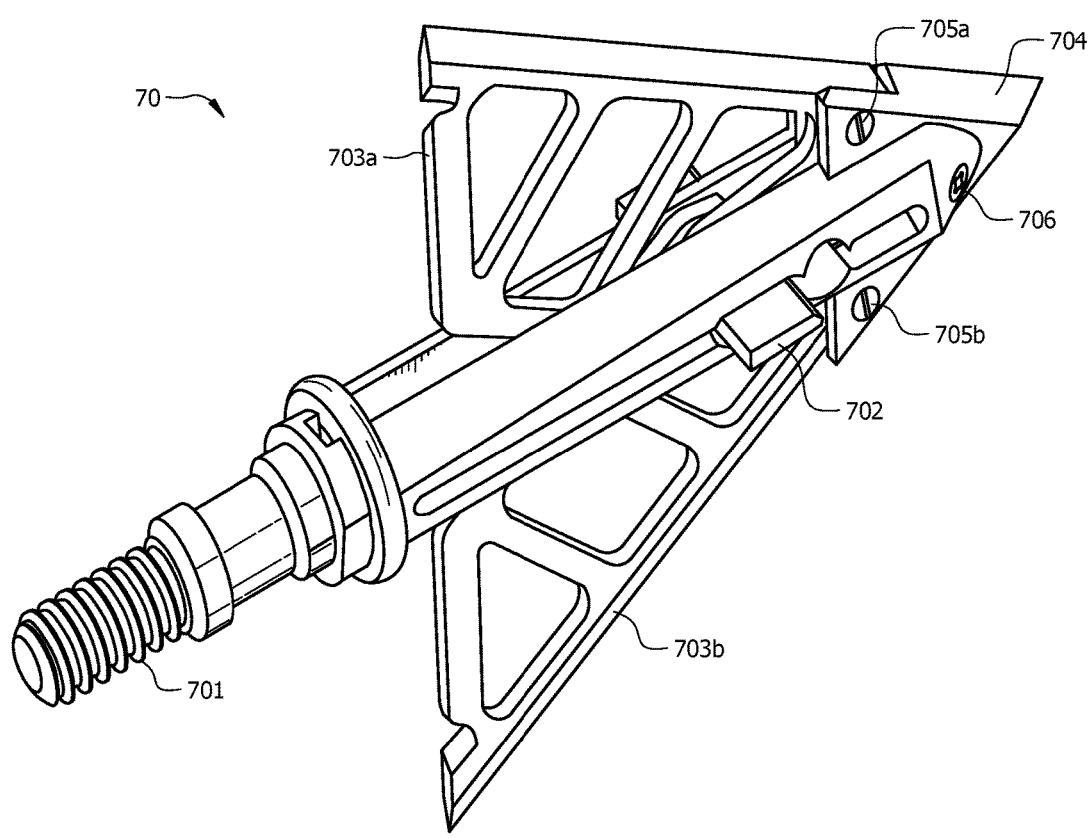
FIG. 9 depicts a view of a rear-deploying mechanical broadhead in an open position according to an embodiment of the present disclosure.
Figure 10:
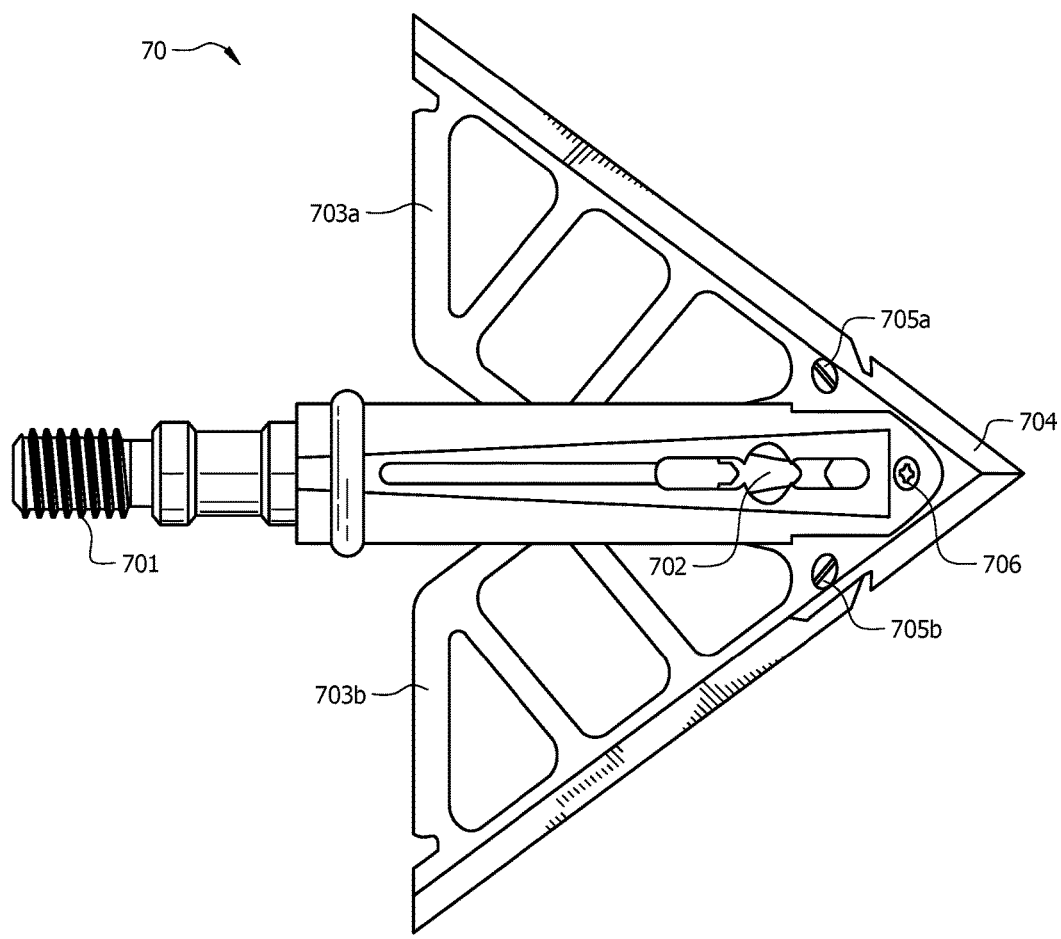
FIG. 10 depicts a view of a rear-deploying mechanical broadhead in an open position according to an embodiment of the present disclosure.
Figure 11:
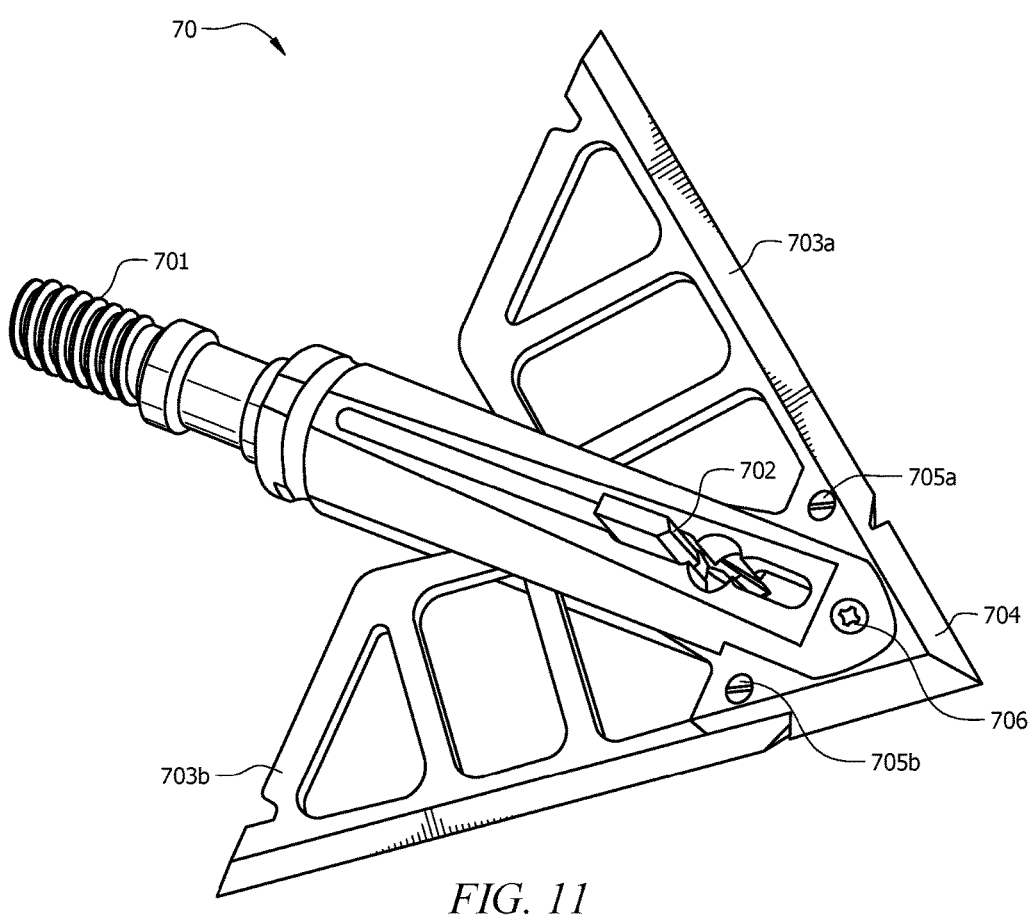
FIG. 11 depicts a view of a rear-deploying mechanical broadhead in an open position according to an embodiment of the present disclosure.

FIGS. 5 and 6 depict perspective views of rear-deploying mechanical broadhead 50 in a closed position from a view behind and in front of the drive pin/key respectively according to an embodiment of the present disclosure. Blades 501 as well as the back of tip 502 are depicted in an east-to-west direction on broadhead 50 while drive pin/key 503 is depicted in a north-to-south direction in FIGS. 5 and 6.

FIGS. 7-11 depict views of rear-deploying mechanical broadhead 70 in an open position according to embodiments of the present disclosure. Broadhead 70 depicts blades 703a, 703b on diametrically opposite sides of body 701 and extending outwardly from body 701. Blades 703a, 703b may move to an open position as depicted in FIGS. 7-11 when drive pin/key 702 moves from a first position close to tip 704 to a second position away from tip 704 within a slot or chamber in body 701. Body 701 may have a first end and a second end having an opening/slot at the second end for receiving tip/body pin 706 that may couple body 701 to tip 704. Blades 703a, 703b may be coupled to tip 704 and attached with blade pins 705a, 705b secured in slots on opposite sides of body 701. Blades 703a, 703b may receive blade pins 705a, 705b at the forward portions of blades 703a, 703b nearer to tip 704 and the second end of body 701.

Figure 12A:
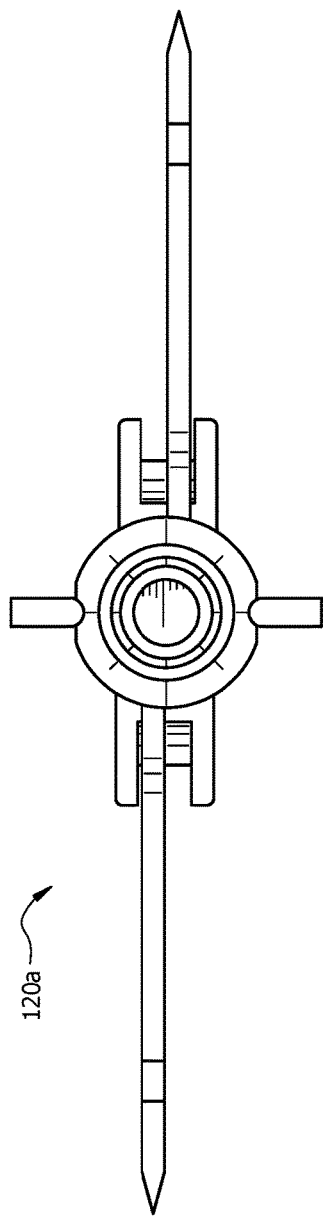
FIG. 12a depicts a perspective view of a rear-deploying mechanical broadhead in an open position from a view behind the drive pin/key according to an embodiment of the present disclosure.
Figure 12B:
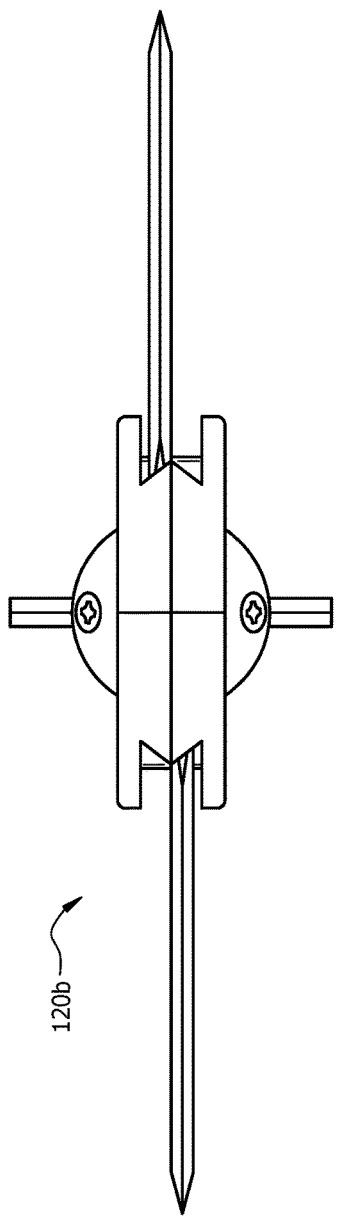
FIG. 12b depicts a perspective view of a rear-deploying mechanical broadhead in an open position from a view in front of the drive pin/key according to an embodiment of the present disclosure.

FIGS. 12a and 12b depict perspective views of a rear-deploying mechanical broadhead in an open position from a view behind and in front of the drive pin/key respectively according to embodiments of the present disclosure. Blades of broadhead 120a, 120b are depicted in an east-to-west direction on broadhead 120a, 120b.

Figure 13:
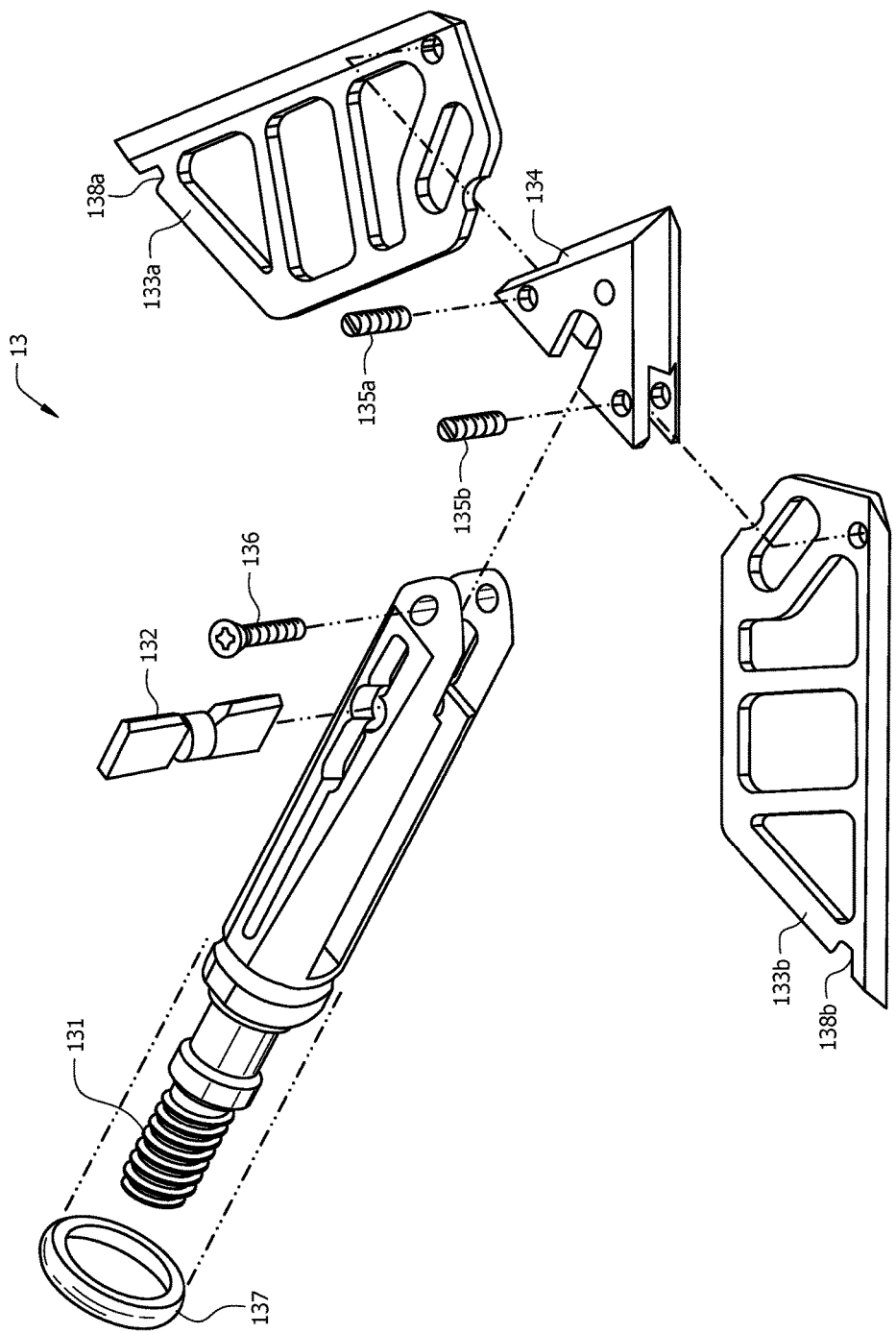
FIG. 13 depicts components of a rear-deploying mechanical broadhead according to an embodiment of the present disclosure.
Figure 14:
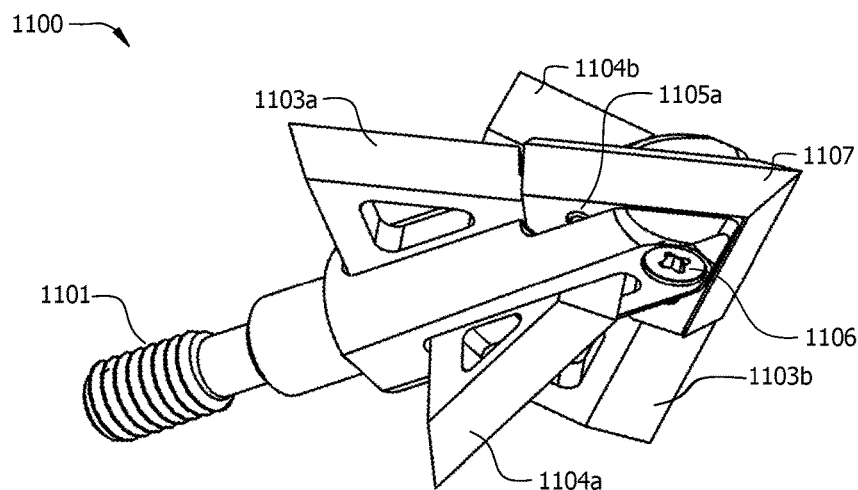
FIG. 14 depicts a perspective view of a fixed broadhead according to an embodiment of the present disclosure.
Figure 15:
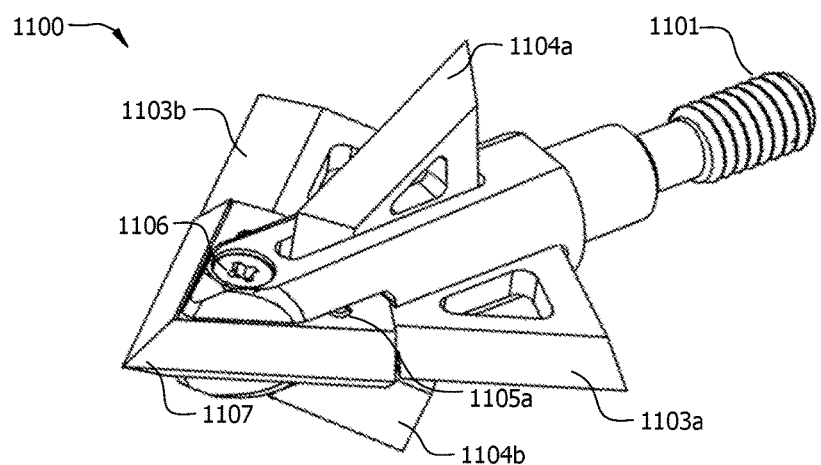
FIG. 15 depicts a perspective view of a fixed broadhead according to an embodiment of the present disclosure.
Figure 16:
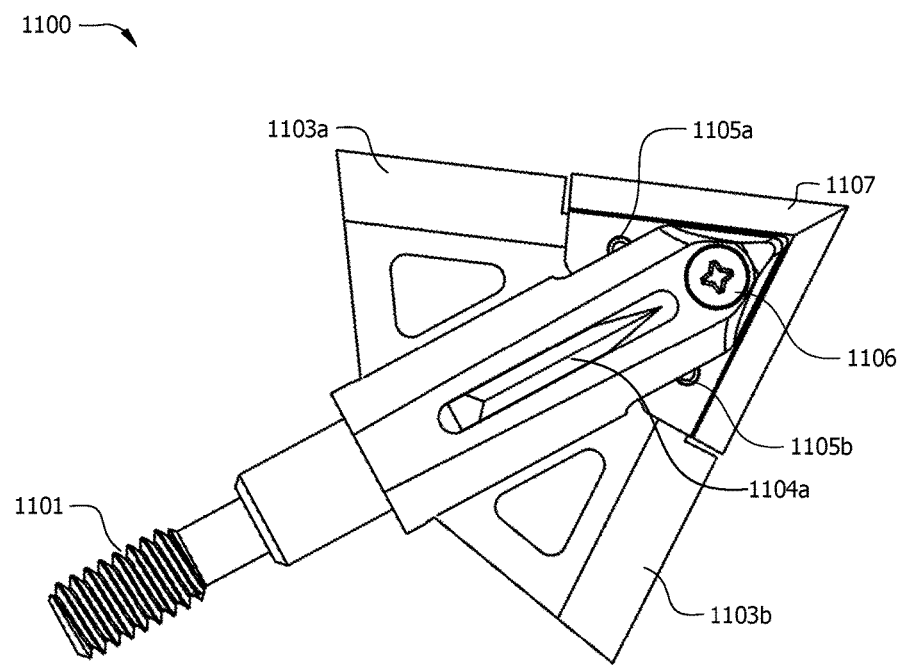
FIG. 16 depicts a view of a fixed broadhead according to an embodiment of the present disclosure.
Figure 17:
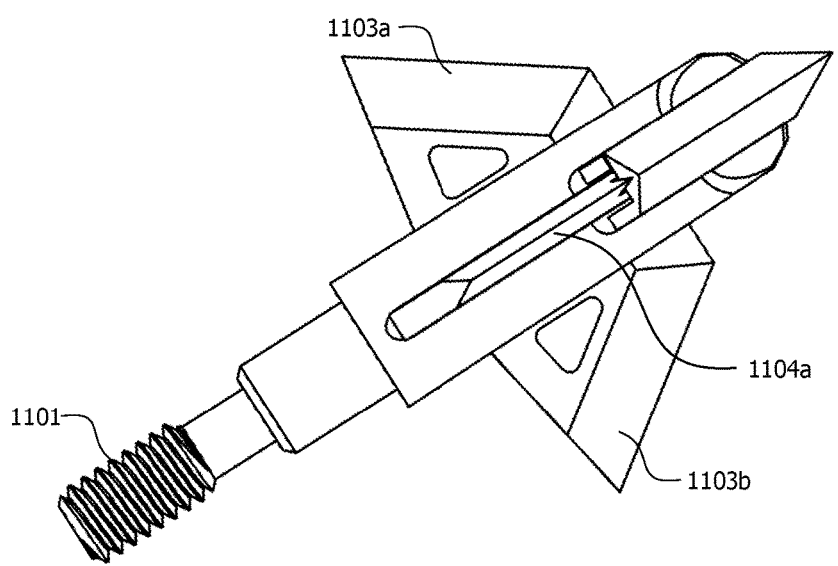
FIG. 17 depicts a view of a fixed broadhead according to an embodiment of the present disclosure.

FIG. 13 depicts components of rear-deploying mechanical broadhead 13 according to an embodiment of the present disclosure. This view may depict how drive pin/key 132 may be inserted into body 131 through a slot or chamber within body 131. As previously described, drive pin/key 132 may be in a first position with the slot or chamber of body 131 closer to tip 134 when blades 133a, 133b are in a closed position and away from tip 134 in a second position when blades 133a, 133b are in an open position. FIG. 13 also depicts how tip/body pin 136 may be inserted into an opening at the pointed end of tip 134 to couple tip 134 to body 131. Similarly, FIG. 13 depicts how blade pins 135a, 135b may be inserted through tip 134 to secure blades 133a, 133b to tip 134 according to an embodiment of the present disclosure. The dotted lines on FIG. 13 depict how each of blade pins 135a, 135b and tip/body pin 136 fit into broadhead 13 to secure body 131, tip 134 and blades 133a, 133b to each other according to embodiments of the present disclosure. In some embodiments of the present disclosure, o-ring 137 may be secured within notches 138a, 138b in blades 133a, 133b.

While the drive pin/key has been described or depicted as generally taking the form of a pin or rod, it should be appreciated that the drive pin/key may be any object that is not formed as part of the body of the broadhead that may be used to push the blades without departing from the present disclosure. Further, while the blade pins and tip/body pins may be referred to as pins, it should be appreciated that they may take the form of a screw or other locking mechanism according to embodiments of the present disclosure.

Broadheads formed according to embodiments of the present disclosure may provide secure blades that do not open until impact with a large tip that is secured to the body. These broadheads may provide for one of the smallest in-flight diameters (approximately less than 5⁄8 inches) with one of the largest cutting diameters (approximately 1 3⁄4 inches). The structure of broadheads formed according to embodiments of the present disclosure may provide for a stronger blade design wherein the drive key may act as a bleeder blade when it rests in its final position.

FIGS. 14-17 depict views of fixed broadhead 1100 according to an embodiment of the present disclosure. Fixed broadhead 1100 may include main blades 1103a, 1103b on diametrically opposite sides of body 1101 extending outwardly from body 1101. It should be appreciated that main blades 1103a, 1103b may be disposed diametrically opposite each other along a longitudinal axis of body 1101. Fixed broadhead 1100 also depicts secondary blades 1104a, 1104b on diametrically opposite sides of body 1101 extending outwardly from body 110 opposite main blades 1103a, 1003b. It should be appreciated that secondary blades 1104a, 1104b may be disposed diametrically opposite each other along a latitudinal axis of body 1100. Main blades 1103a, 1103b and secondary blades 1104a, 1104b may be fixed in an open or operable position, as depicted in FIGS. 14-17. Body 1101 may have a first end and a second end having an opening/slot at the second end for receiving tip/body pin 1106 that may couple body 1101 to tip 1107. It should be appreciated that tip 1107 may be made of two separate components and may include pins 1905a, 1905b (FIGS. 19-20) as part of tip 1107. Main blades 1103a, 1103b and secondary blades 1104a, 1104b may be coupled to tip 1107 and attached with blade pins 1105a, 1105b secured in slots on opposite sides of body 1101. Main blades 1103a, 1103b and secondary blades 1104a, 1104b may receive blade pins 1105a, 1105b at the forward portions of main blades 1103a, 1103b and secondary blades 1104a, 1104b nearer to tip 1107 and the second end of body 1101.

Figure 18A:
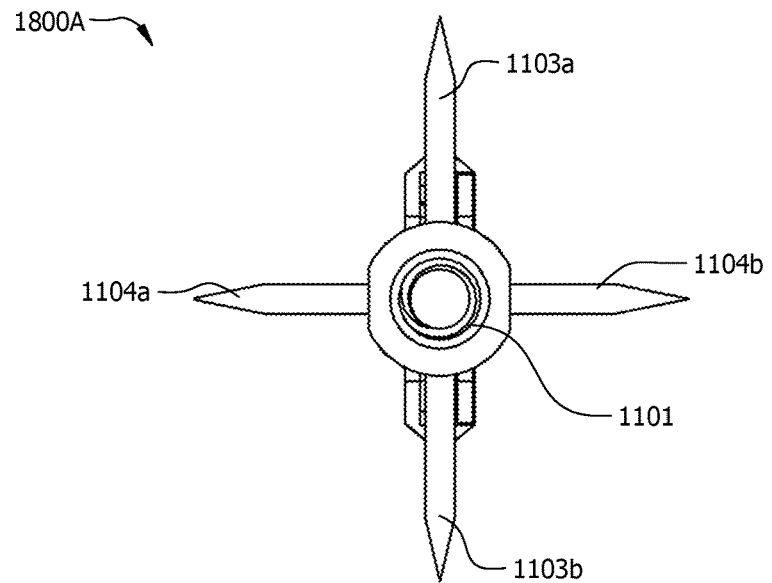
FIG. 18A depicts a view of a fixed broadhead from behind a blade slot according to an embodiment of the present disclosure.
Figure 18B:
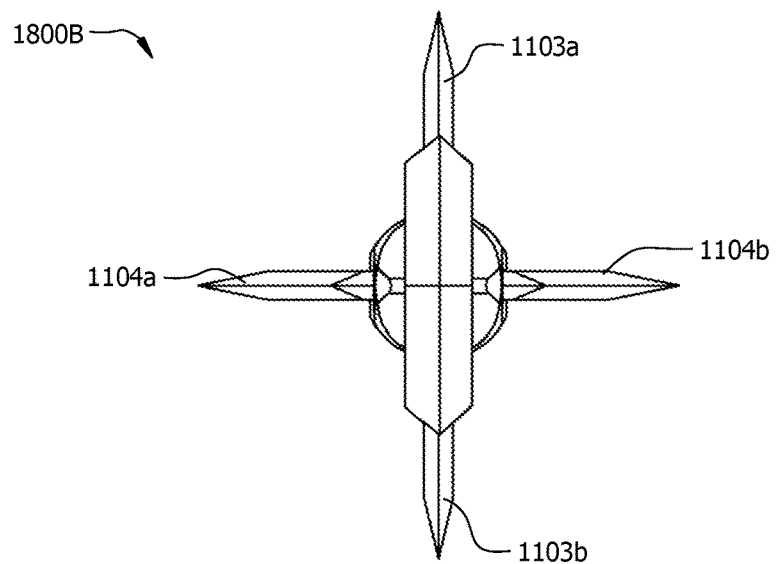
FIG. 18B depicts a view of a fixed broadhead from a front of a blade slot according to an embodiment of the present disclosure.

FIGS. 18A and 18B depict perspective views of a fixed broadhead behind and in front of a blade slot, respectively, according to embodiments of the present disclosure. Main blades 1103a, 1103b of fixed broadhead 1800a, 1800b are depicted in a north-to-south or longitudinal direction on broadhead 1800a, 1800b. Secondary blades 1104a, 1104b of fixed broadhead 1800a, 1800b are depicted in an east-to-west or latitudinal direction on broadhead 1800a, 1800b.

Figure 19:
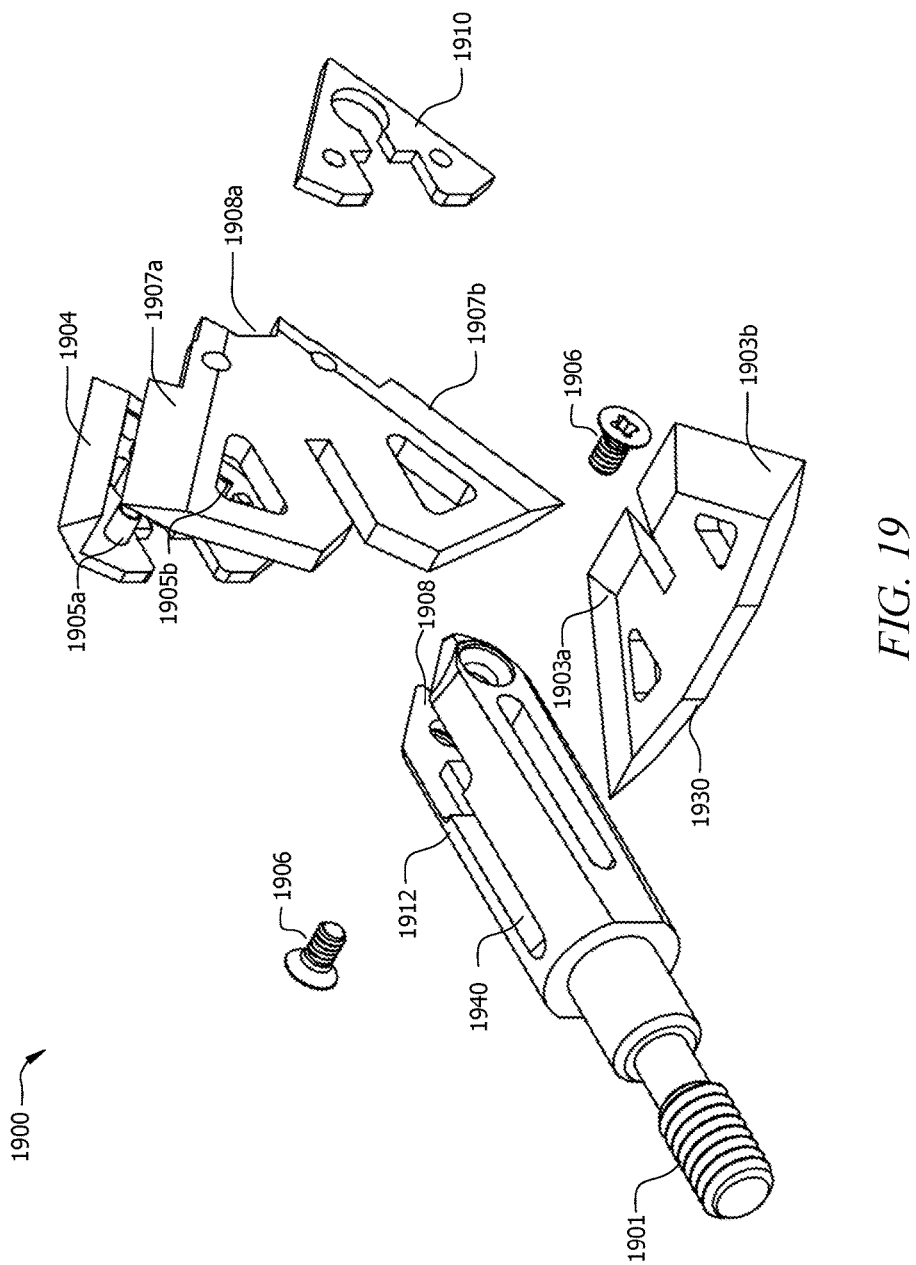
FIG. 19 depicts components of a fixed broadhead according to an embodiment of the present disclosure.
Figure 20:
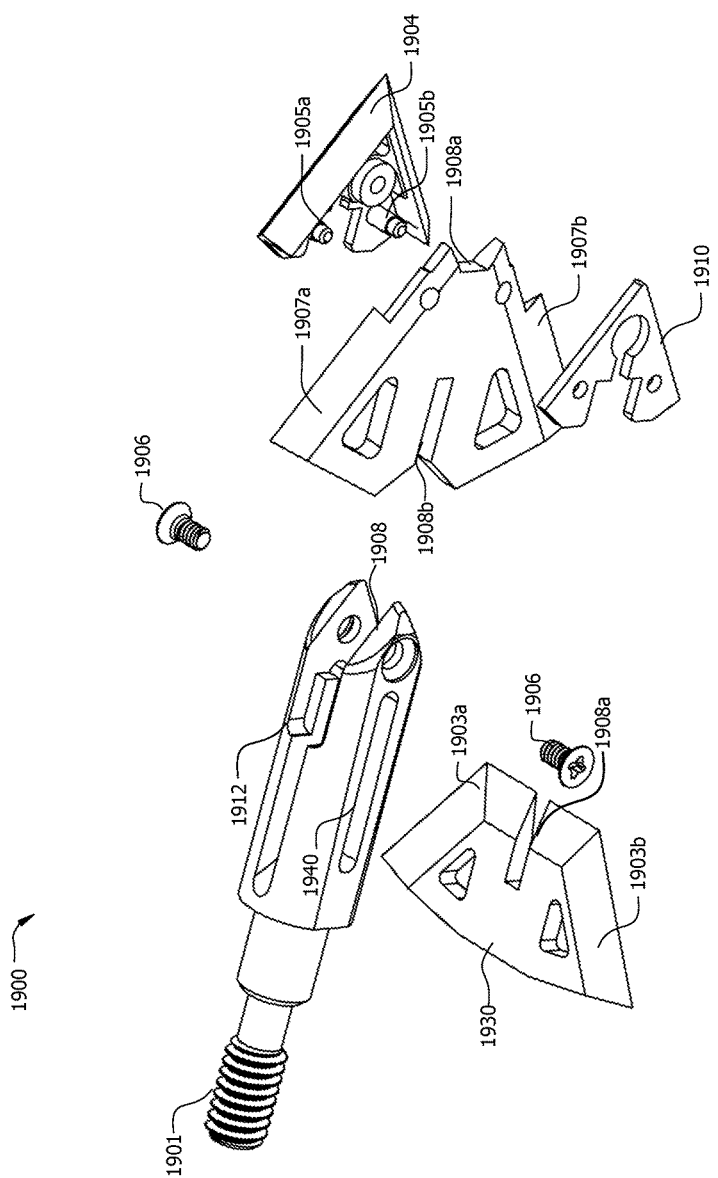
FIG. 20 depicts components of a fixed broadhead according to an embodiment of the present disclosure.

FIGS. 19 and 20 depict components of fixed broadhead 1900 according to an embodiment of the present disclosure. FIGS. 19 and 20 may depict how main blades 1903a, 1903b may attach to tip 1904 through slot or chamber 1940 within body 1901. Main blades 1903a, 1903b may attach to tip 1904 by sliding over pins or posts 1905a, 1905b provided by tip 1904. Secondary blades 1907a, 1907b may be inserted into ferrule 1912 through blade slot 1908. Main blades 1903a, 1903b and tip 1904 may be pushed or secured into position in which main blades 1903, 1903b and secondary blades 1907a, 1907b may be interlocked in ferrule 1912. When interlocked into position, main blades 1903a, 1903b may be pushed or secured against a rear of ferrule 1912 in a locked position. It should be appreciated that blade slot 1908 may provide an open end of ferrule 1912. It should also be appreciated that body 1901 may provide a closed end of ferrule 1912, and body 1901 may be threaded.

Fixed broadhead 1900 may provide three locking or anchor points in an embodiment of the present disclosure. A first locking point may provide main blades 1903a, 1903b connected to tip 1904. Tip cap 1910 may cover tip 1904 when main blades 1903a, 1903b are attached to tip 1904. One or more tip screws 1906 may hold tip 1904 main blades 1903, 1903b and/or secondary blades 1907a, 1907b in the locked position. A second locking point may provide main blades 1903, 1903b and secondary blades 1907a, 1907b interlocked in ferrule 1912. A third locking point may provide main blades 1903a, 1903b pushed or secured against a rear of ferrule 1912.

Fixed broadheads formed according to embodiments of the present disclosure may provide the same tip as mechanical broadheads. Fixed broadheads may provide similar ferrules or ferrule designs as mechanical broadheads, but fixed broadheads may utilize the drive key slot provided by mechanical broadheads as a blade slot for secondary blades in embodiments of the present disclosure. It should be appreciated that mechanical broadheads and fixed broadheads may provide a similar appearance or design in an operable or open position. It should also be appreciated that ferrules provided by fixed broadheads may not include an O-ring or an O-ring groove because main blades and secondary provided by fixed broadheads remain open. It should be appreciated that a hole in which a drivekey is typically inserted into a ferrule may not be provided, and the drivekey may be replaced with a stationary secondary blade. It should further be appreciated that fixed broadheads may provide a retention system that provide a stronger and more advanced blade system than found in traditional blade systems. It should be appreciated that a tip of fixed broadheads may be larger than conventional broadheads and may block a larger percentage of wind from dragging over blades that may be provided in fixed broadheads. It should also be appreciated that by blocking a large percentage, fixed broadheads that include larger tips may provide better flight and stability of fixed broadheads.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A fixed broadhead comprising:
a tip coupled to a body, wherein a slot is disposed within the body;
main blades pinned to the tip, wherein the main blades are pinned to the tip with at least two blade pins; and
secondary blades disposed within the slot and interlocked with the main blades.

2. The fixed broadhead of claim 1, wherein the interlocked main blades and the secondary blades improve strength and precision of the fixed broadhead.

3. The fixed broadhead of claim 1, wherein the tip is coupled to the body by at least two tip screws.

4. The fixed broadhead of claim 1, wherein the main blades are disposed diametrically opposite each other along a longitudinal axis of the body.

5. The fixed broadhead of claim 1, wherein the secondary blades are disposed diametrically opposite each other along a latitudinal axis of the body.

6. The fixed broadhead of claim 1 further comprising:
a plurality of anchor points that provide stability and lock the tip, the main blades, and the secondary blades with the body.

7. The fixed broadhead of claim 6, wherein a first anchor point of the plurality of anchor points stabilizes and locks the main blades with the tip.

8. The fixed broadhead of claim 7, wherein a second anchor point of the plurality of anchor points stabilizes and interlocks the main blades with the secondary blades.

9. The fixed broadhead of claim 8, wherein a third anchor point of the plurality of anchor points stabilizes and interlocks the main blades with into a rear of a ferrule.

10. A fixed broadhead comprising:
main blades disposed diametrically opposite each other along a longitudinal axis of a body;
secondary blades disposed diametrically opposite each other along a latitudinal axis of the body; and
a tip made of two separate components and coupled to the body, the tip having a hollow area in which the main blades rest, wherein the secondary blades are disposed within a slot in the body and interlock with the main blades.

11. The fixed broadhead of claim 10 further comprising:
an opening within the body that receives at least one screw that couples the body to the tip.

12. The fixed broadhead of claim 10 further comprising:
at least one blade pin that couples the main blades to the tip.

13. The fixed broadhead of claim 10, wherein the main blades and the secondary blades interlock and improve strength and precision of the fixed broadhead.

14. The fixed broadhead of claim 10 further comprising:
a plurality of anchor points that provide stability and lock the tip, the main blades, and the secondary blades with the body.

15. The fixed broadhead of claim 14, wherein a first anchor point of the plurality of anchor points stabilizes and locks the main blades with the tip.

16. The fixed broadhead of claim 15, wherein a second anchor point of the plurality of anchor points stabilizes and interlocks the main blades with the secondary blades.

17. The fixed broadhead of claim 16, wherein a third anchor point of the plurality of anchor points stabilizes and interlocks the main blades with into a rear of a ferrule.

18. The fixed broadhead of claim 17, wherein the first, second, and third anchor points provide a strong retention system and improve precision of the fixed broadhead in its movement toward a target.

* * * * *